(12) United States Patent
Uchida

(10) Patent No.: US 10,763,676 B2
(45) Date of Patent: Sep. 1, 2020

(54) ELECTRONIC DEVICE AND CHARGING CONTROL METHOD

(71) Applicant: TOSHIBA CLIENT SOLUTIONS CO., LTD., Koto-ku, Tokyo (JP)

(72) Inventor: Katsuhiro Uchida, Ome Tokyo (JP)

(73) Assignee: Toshiba Client Solutions CO., LTD., Tokyo (JP)

(*) Notice: Subject to any disclaimer, the term of this patent is extended or adjusted under 35 U.S.C. 154(b) by 94 days.

(21) Appl. No.: 16/207,523

(22) Filed: Dec. 3, 2018

(65) Prior Publication Data

US 2020/0006977 A1    Jan. 2, 2020

(30) Foreign Application Priority Data

Jun. 29, 2018    (JP) .................. 2018-124491

(51) Int. Cl.
| | |
|---|---|
| *H02J 7/00* | (2006.01) |
| *H02J 7/04* | (2006.01) |
| *H02J 7/02* | (2016.01) |
| *H02J 7/06* | (2006.01) |

(52) U.S. Cl.
CPC .............. *H02J 7/00* (2013.01); *H02J 7/007* (2013.01); *H02J 7/00041* (2020.01); *H02J 7/0045* (2013.01); *H02J 7/00712* (2020.01); *H02J 7/022* (2013.01); *H02J 7/045* (2013.01); *H02J 7/06* (2013.01); *H02J 7/00034* (2020.01); *H02J 7/0036* (2013.01); *H02J 7/0047* (2013.01); *H02J 2207/40* (2020.01)

(58) Field of Classification Search
None
See application file for complete search history.

(56) References Cited

U.S. PATENT DOCUMENTS

| | | | | |
|---|---|---|---|---|
| 9,740,261 | B2 * | 8/2017 | Waters | ............... G06F 1/30 |
| 10,261,557 | B2 * | 4/2019 | Kim | ................... G06F 1/10 |
| 2017/0126041 | A1 | 5/2017 | Sato | |
| 2017/0139467 | A1 * | 5/2017 | Waters | ............ G06F 13/385 |

FOREIGN PATENT DOCUMENTS

| | | |
|---|---|---|
| JP | 2010-206948 A | 9/2010 |
| WO | WO 2016/013451 A1 | 1/2016 |

\* cited by examiner

*Primary Examiner* — Leigh M Garbowski
(74) *Attorney, Agent, or Firm* — Knobbe, Martens, Olson & Bear, LLP

(57) ABSTRACT

According to one embodiment, an electronic device includes a power delivery controller and an embedded controller. The power delivery controller supplies a first signal to the embedded controller when reception of a power from an external device is started, and supplies a second signal to the embedded controller when a first value of the power from the external device is changed. The embedded controller acquires first data from the power delivery controller when the first signal is supplied in an activation time, acquires a second value of the power to be received from the external device from a power circuit, and acquires second data from the power delivery controller when the first value indicated by the first data is different from the second value.

15 Claims, 4 Drawing Sheets

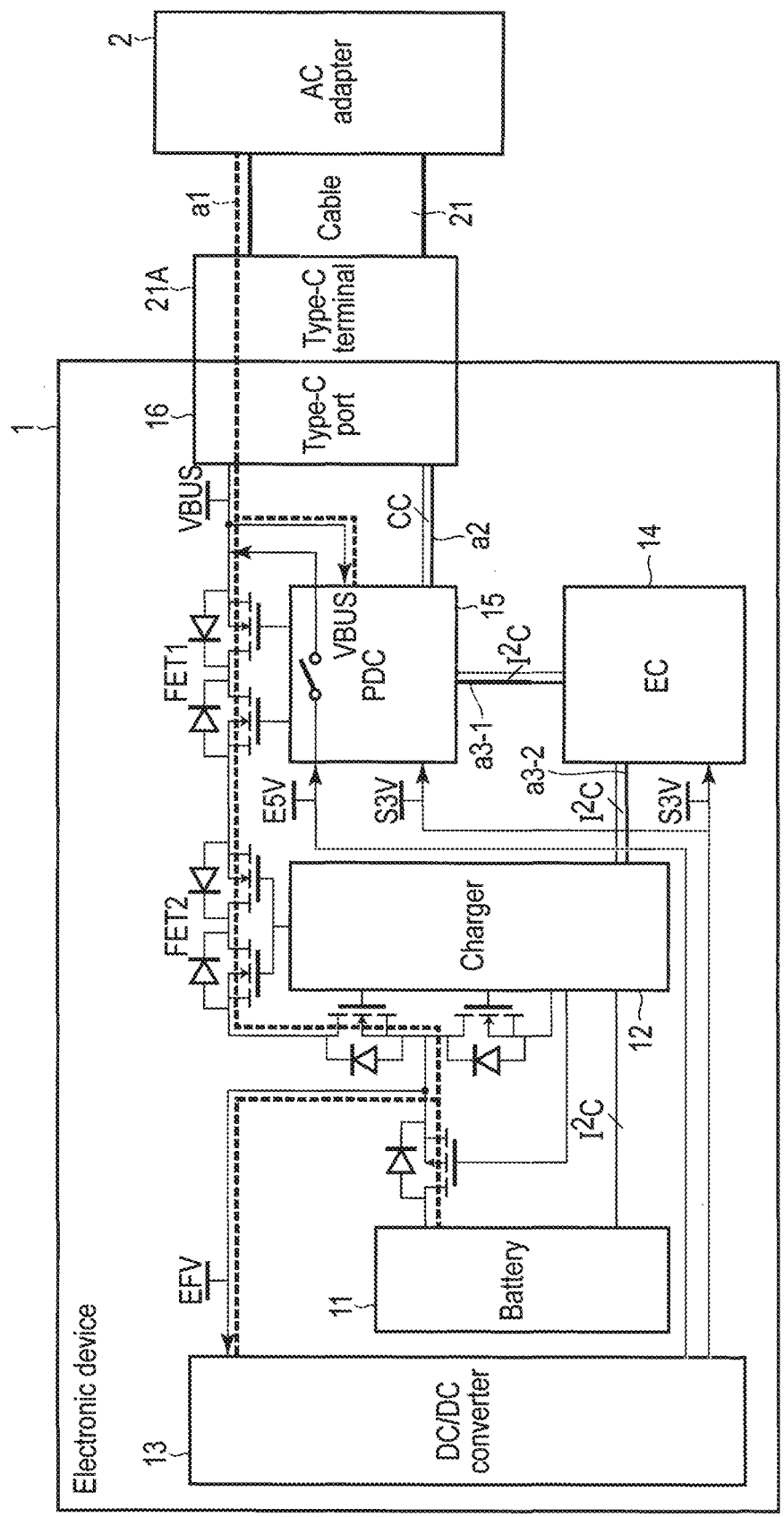
F I G. 1

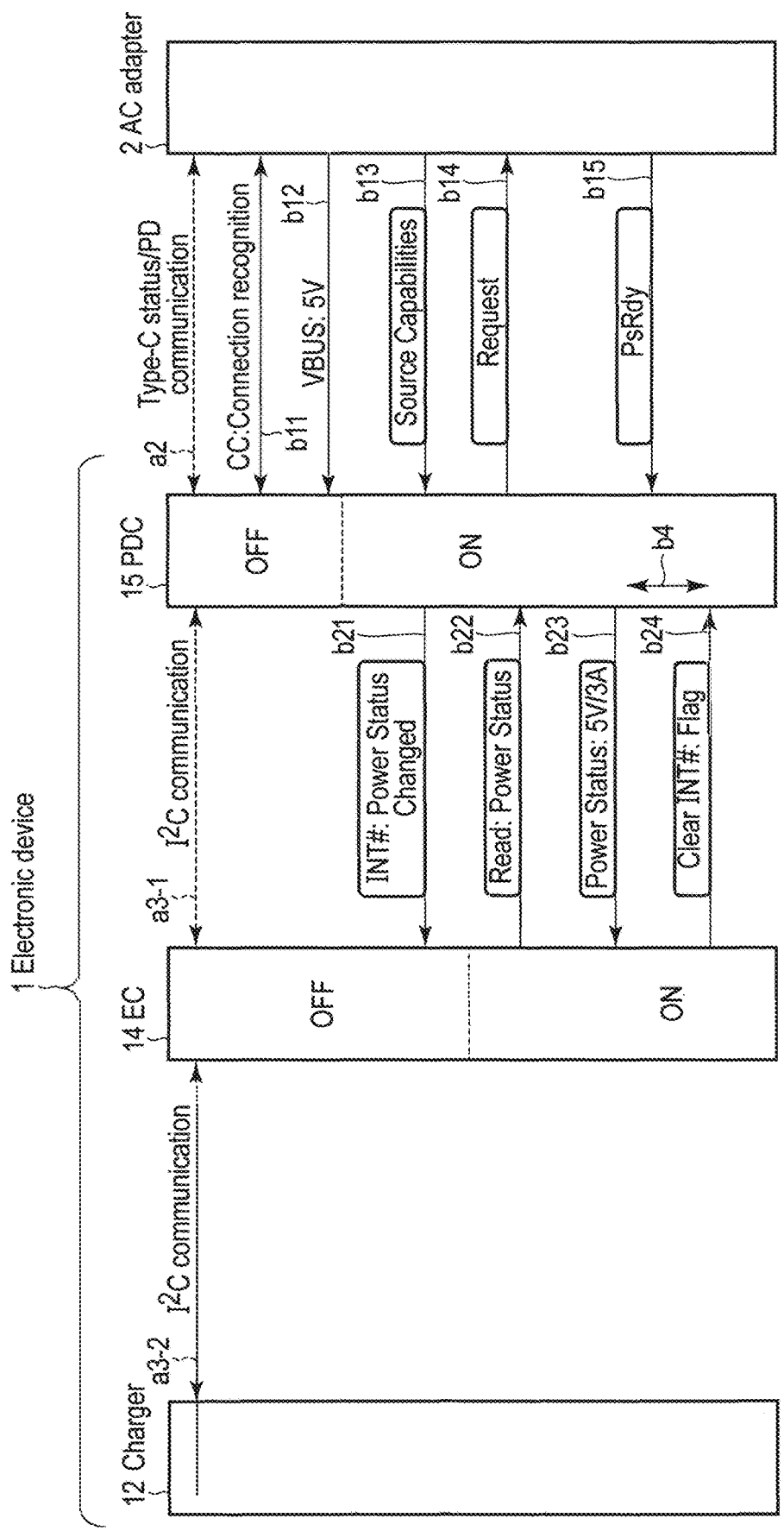
F I G. 2

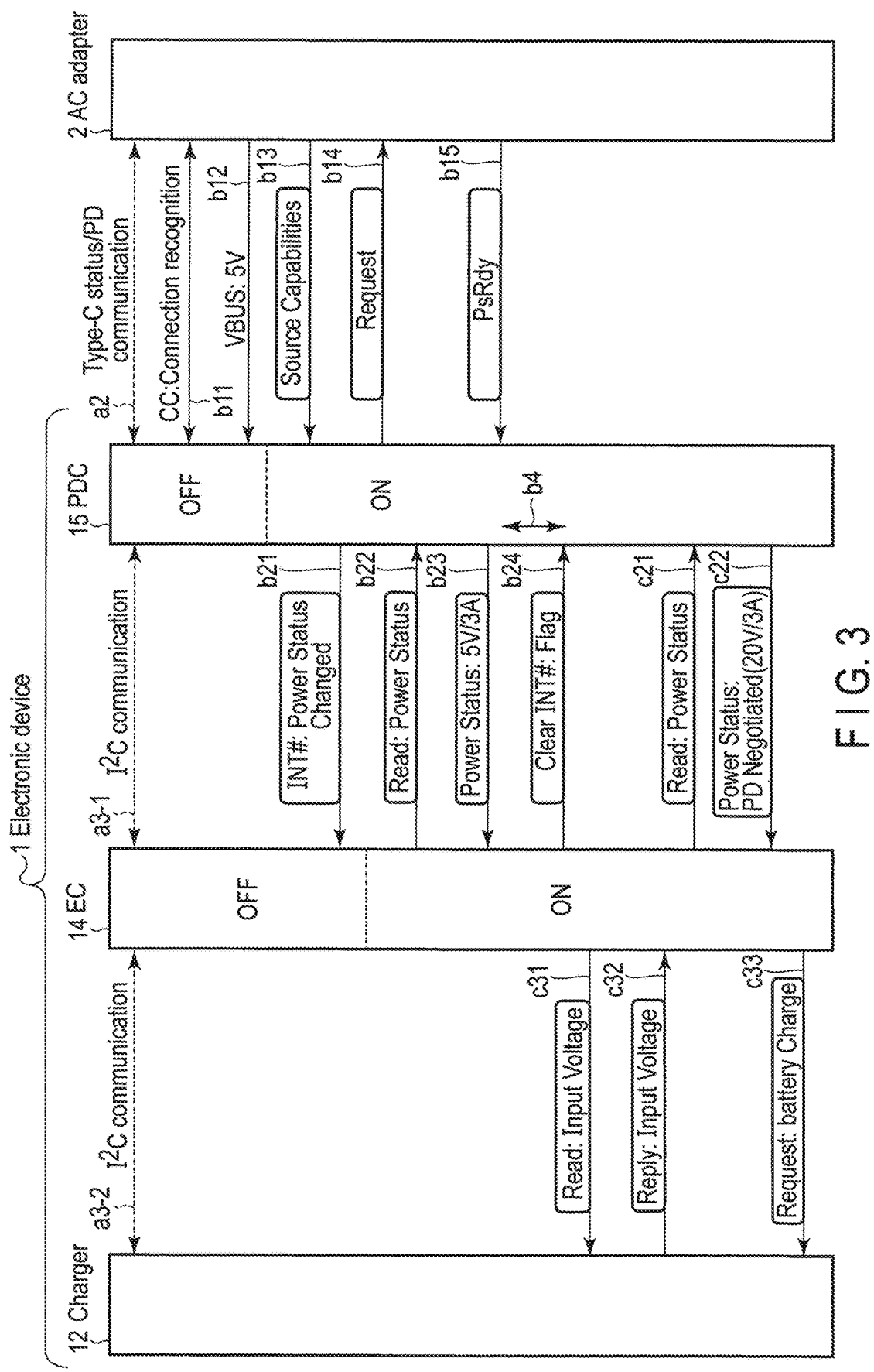
F I G. 3

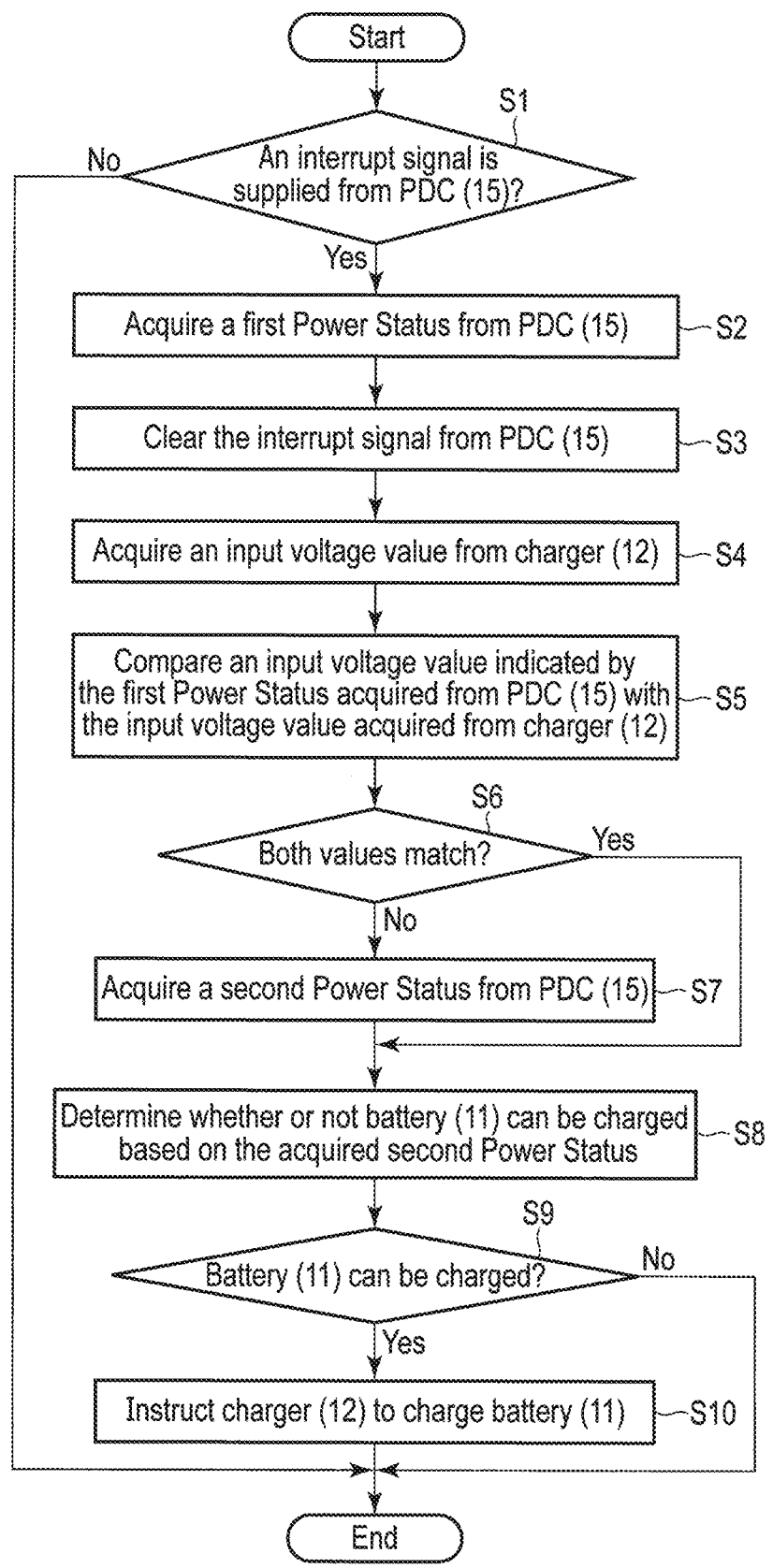
F I G. 4

ELECTRONIC DEVICE AND CHARGING CONTROL METHOD

CROSS-REFERENCE TO RELATED APPLICATIONS

This application is based upon and claims the benefit of priority from Japanese Patent Application No. 2018-124491, filed Jun. 29, 2018, the entire contents of which are incorporated herein by reference.

FIELD

Embodiments described herein relate generally to an electronic device and a charging control method.

BACKGROUND

In recent years, various battery-operable electronic devices such as clamshell personal computers, tablet personal computers, and smartphones are used. Such an electronic device generally includes an interface function to transmit/receive data with an external device. As an interface standard, Universal Serial Bus (USB) standard is well-known. Through an interface conforming to the USB standard, not only data but also power can be transferred. For example, when an AC adapter is, as an external device, connected to the electronic device, the battery thereof can be charged with power from the AC adapter.

When an AC adapter is connected to an electronic device with a battery which has died, components in the electronic device are activated with power from the AC adapter, and charging of the battery is started. However, charging of battery may not proceed because of delays in activation times between the components, for example.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an example of the structure of a power of an electronic device of an embodiment.

FIG. 2 is an exemplary view for explaining a comparative example associated with charge control of a battery in a Dead Battery state.

FIG. 3 is an exemplary view showing charge control of the battery in a Dead Battery state of the electronic device of the embodiment.

FIG. 4 is an exemplary flowchart showing charge control of the battery in the Dead Battery state performed by the electronic device of the embodiment.

DETAILED DESCRIPTION

Various embodiments will be described hereinafter with reference to the accompanying drawings.

In general, according to one embodiment, an electronic device is operable with a battery. The electronic device includes a connector, a power delivery controller, a power charge/discharge circuit and an embedded controller. The connector is connectable with a cable enabling data transfer and power transfer. The power delivery controller controls power transfer between the electronic device and an external device connected to the electronic device via the connector. The power charge/discharge circuit controls charging and discharging of the battery. The embedded controller communicates with the power delivery controller and the power charge/discharge circuit, and charges the battery with a power received from the external device. The power delivery controller supplies a first interrupt signal to the embedded controller to cause the embedded controller to acquire first status data including a first power reception condition, when reception of the power from the external device is started, and supplies a second interrupt signal to the embedded controller to cause the embedded controller to acquire second status data including a second power reception condition, when a first voltage value of the power to be received from the external device is changed by communicating with the external device. The embedded controller acquires the first status data from the power delivery controller, when the first interrupt signal from the power delivery controller is supplied in an activation time, acquires a second voltage value of the power to be received from the external device from the power charge/discharge circuit, after a process associated with the first interrupt signal is completed, and acquire the second status data from the power delivery controller, when the first voltage value indicated by the first status data is different from the second voltage value.

FIG. 1 is an exemplary view showing an example of the structure of a power source of an electronic device 1 of the present embodiment.

As shown in FIG. 1, the electronic device 1 of the present embodiment includes, as a structure associated with the power source, a battery 11, a charger (power charge/discharge circuit) 12, a DC/DC converter 13, an embedded controller (EC) 14, a power delivery controller (PDC) 15, and a Type-C port (connector) 16, for example.

Type-C port 16 is a port which can receive a Type-C terminal defined by the USB standard. PDC 15 supports a power delivery function, and if an external device is connected to the Type-C port 16, the PDC 15 determines which functions as a Source device and which functions as a Sink device between the PDC 15 and the external device. A Source device is a device which supplies power, and a Sink device is a device which receives power. For example, if one device outputs a signal of high value to a signal line and the other device outputs a signal of low value, the device outputting the signal of high value becomes a Source device and the other device outputting the signal of low value becomes a Sink device. The electronic device 1 of the present embodiment can function as a Source device or a Sink device, and the PDC 15 outputs signals of high value and signals of low value alternately. Furthermore, the AC adapter 2 as shown in FIG. 1 only functions as a Source device and continuously outputs signals of high value. Thus, if a Type-C terminal 21A of cable 21 of AC adapter 2 is inserted into the Type-C port 16, the PDC 15 of the electronic device 1 outputs signals of low value, and the AC adapter 2 outputs signals of high value. However, they do not function conversely. Thus, the AC adapter 2 always function as a Source device and the PDC 15 of the electronic device 1 functions as a Sink device. That is, the electronic device 1 is operated with power (a1) from the AC adapter 2, and the battery can be charged with the power. Note that both the PDC 15 of the electronic device 1 and the AC adapter 2 recognize connection with an external device by detecting a voltage condition of a CC line (a2) defined by the USB standard. The external device here is the AC adapter 2 for the PDC 15 of the electronic device 1 and is the electronic device 1 for the AC adapter 2. The PDC 15 of the electronic device 1 and the AC adapter 2 output signal of high value or signal of low value to determine Source and Sink devices on the CC line. That is, the PDC 15 of the electronic device 1 alternately repeat pull-up and pull-down of the CC line at certain intervals, and the AC adapter 2 continues pull-up of the CC line. The CC line is used for communication between the PDC 15 of the electronic device 1 and the AC adapter 2 after determination of the Source and Sink devices. The communication is performed to conform to the USB Power Delivery Specification, and may be referred to as PD communication.

If an external device which can function as either a Source device or a Sink device is connected to the Type-C port 16, the external device outputs signals of high value and signals of low value alternately as well. Thus, unlike the AC adapter 2, the PDC 15 of the electronic device 1 may output signals of high value and the external device may output signals of low value. That is, the PDC 15 of the electronic device 1 may function as a Source device and the external device may function as a Sink device. In such a case, power of the battery 11 is supplied to the external device. Charging/discharging of the battery 11 is controlled by a charger 12 under the control of the EC 14. The EC 14 can perform communication with the PDC 15 through I²C bus (a3-1) and can perform communication with the charger 12 through I²C bus (a3-2). When, for example, the EC 14 receives a notification from the PDC 15 that it functions as a Sink device, and if a power received from the Source device satisfies a certain condition, the EC 14 then allows the charger 12 to charge the battery 11 with the power from the Source device. The charger 12 can perform communication with the battery 11 through I²C bus and can acquire data such as battery residue and charge rate through the communication.

The PDC 15 can function as a Source device or a Sink device while being connected to an external device if there is power in the battery 11 and if the electronic device 1 is turned on with the power from the battery 11. Such a state will be referred to as Dual Role Power (DRP) state. If the electronic device 1 is turned off, normally, the PDC 15 functions as a Sink device while being connected to an external device, although this depends on the specs of the electronic device 1. If the electronic device 1 is in a state where there is no power in the battery 11 which is referred to as a Dead Battery state, the PDC 15 always functions as a Sink device while being connected to an external device.

The DC/DC converter 13 uses power from the battery 11 or from an external device to generate operation power of each component of the electronic device 1. The EC 14 operates with power of, for example, 3V/3A supplied from the DC/DC converter 13. Unless power is not supplied from an external device and being in a Dead Battery state, power supply continues to the EC 14 from the DC/DC converter 13 even when the system is turned off.

Here, a comparative example will be explained with reference to FIG. 1 and FIG. 2 in order to better understand the charge control of the battery 11 in the Dead Battery state performed in the electronic device 1 of the present embodiment. Specifically, a case where the battery 11 is not charged even when a Source device such as the AC adapter 2 is connected to the Type-C port 16 of the electronic device 1 in the Dead Battery state, will be explained.

When a Type-C terminal 21A of cable 21 is inserted into the Type-C port 16 of the electronic device 1, the AC adapter 2 recognizes that a Sink device, that is, the PDC 15 of the electronic device 1 is connected on the basis of the voltage condition of the CC line (FIG. 2: b11). Note that the AC adapter 2 can output three types of power; 20V/3A, 15V/3A, and 5V/3A. When connection of a Sink device is recognized, the Ac adapter 2 outputs a power of lowest voltage value of the three types, that is, 5V/3A to VBUS (FIG. 2: b12). Note that, if power received from an external device is 20V/3A or 15V/3A, the EC 14 of the electronic device 1 allows charging of the battery 11, and if power received from an external device is 5V/3A, the EC 14 disallows charging of the battery 11.

The PDC in a halt state because of the Dead Battery state of the electronic device 1 is activated with power 5V/3A output on the VBUS from the AC adapter 2. In other words, the PDC 15 starts operation with 5V/3A output on the VBUS from the AC adapter 2. Hereinafter, starting of operation may mean activation according to power supply. The PDC 15 basically operates with power 3V/3A generated by the DC/DC converter 13 as with the EC 14. However, the PDC 15 may operate with 5V/3A output on the VBUS. That is, the PDC 15 can start operation before the DC/DC converter 13 generates power 3V/3A. When the PDC 15 operates as a Source device, the PDC 15 can output power 3V/3A generated by the DC/DC converter 13 on the VBUS.

Upon starting operation with the power 5V/3A on the VBUS, the PDC 15 switches on the gate of FET1 and supplies the power 5V/3A to the system side. The power is initially supplied to the charger 12 to activate it, and the charger 12 then switches on the gate of FET2, and sends power (EFV) boosted as needed to the DC/DC converter 13. Upon reception of the power supply, the DC/DC converter 13 starts operation. After all those processes, the EC 14 receives power supplied from the DC/DC converter 13 and starts the operation. Note that the charger 12 may operate with power from the battery 11.

The PDC 15 which starts the operation receiving the power 5V/3A from the AC adapter 2, before the EC 14 starts the operation, supplies an interrupt signal which notifies a change in Power Status, that is, which notifies that power of 5V/3A is being received from the AC adapter 2 to the EC 14 (FIG. 2: b21). Upon detection of the interrupt signal, the EC 14 acquires Power Status from the PDC 15. However, at that time, the EC 14 does not start the operation, and cannot respond to the interrupt signal. Note that the interrupt signal supplied from the PDC 15 is stored into a register of the EC 14.

As described above, the PDC 15 which starts the operation, when the AC adapter 2 is connected to the electronic device 1 in the Dead Battery state, always function as a Sink device. The PDC 15 operating as a Sink device performs PD communication with the AC adapter 2 operating as a Source device, and acquires Source Capability data of the AC adapter 2 (FIG. 2: b13). The Source Capability data indicate power transmission performance, that is, types of power which can be output. Thus, in this example, three types of 20V/3A, 15V/3A, and 5V/3A are shown in Source Capability data.

Upon acquisition of Source Capability data, the PDC 15 normally selects the maximum power conforming to the specs of the electronic device 1. In this example, 20V/3A is selected, and the PDC 15 requests power of this value to the AC adapter 2 (FIG. 2: b14). Furthermore, at this time, the EC 14 starts the operation and recognizes the interrupt signal from the PDC 15. In this point of time, power 5V/3A is being received from the AC adapter 2, and the EC 14 acquires Power Status indicative of 5V/3A (FIG. 2: b22 and b23).

Upon reception of the request from the PDC 15, the AC adapter 2 starts output of the power 20V/3A, and, as a response to the request, the AC adaptor 2 sends a PsRdy packet (FIG. 2: b15). By receiving the PsRdy packet, the PDC 15 recognizes that the output of power 20V/3A is approved by the AC adapter 2. The PDC 15 supplies an interrupt signal which notifies a change in Power Status, that is, which notifies that power 20V/3A is now being received from the Ac adapter 2 to the EC 14 (FIG. 2: The interrupt signal is supplied during the period indicated by b4). Note that the power output by the AC adapter 2 on the VBUS is directly supplied to the charger 12, and thus, an input voltage value of the charger 12 is changed to 20V from 5V.

Now, a case where the EC 14 does not complete a process with respect to the former interrupt signal which acquires Power Status indicative of 5V/3A, is considered. Specifically, the EC 14 performs initialization of a register in which an interrupt signal is stored, and completes a process with respect to the interrupt signal. However, a case considered here is where the initialization of the register is not performed yet. The initialization of the register for interrupt signals is performed to receive a next interrupt signal. Storing an interrupt signal into the register may be referred to as asserting interrupt signal or setting flag, and performing the initialization of the register may be referred to as clearing flag or clearing interrupt signal.

In such a case, even if the PDC 15 supplies a second interrupt signal, the first interrupt signal is still registered, and the register is initialized after acquisition of Power Status indicative of 5V/3A by the first interrupt signal (FIG. 2: b24), and thus, the EC 14 cannot recognize the supply of the second interrupt signal. Thus, the EC 14 cannot acquire Power Status indicative of 20V/3A. Consequently, the EC 14 may incorrectly recognize that power of 5V/3A is supplied from the AC adapter 2.

As described above, the EC 14 allows charging of the battery 11 if the power received from the external device is 20V/3A. However, the EC 14 disallows charging of the battery 11 if the power received from the external device is 5V/3A. Thus, in this case, although power of 20V/3A is supplied from the AC adapter 2, charging of the battery 11 is not performed.

Note that, if the EC 14 completes a process with respect to the first interrupt signal to notify Power Status indicative of 5V/3A before the second interrupt signal to notify Power Status indicative of 20V/3A is supplied, that is, if the initialization of the register is performed and supply of the second interrupt signal can be recognized, the above case does not occur and the battery 11 is charged.

In consideration of the above comparative example, now, the operation of the electronic device 1 of the present embodiment will be explained with reference to FIG. 1 and FIG. 3, in which the batter 11 can be properly charged even if a Source device such as the AC adapter 2 is connected to the Type-C port 16 of the electronic device 1 in the Dead Battery state.

In FIG. 3, the exchanges indicated by symbols b11 to b15 between the PDC 15 of the electronic device 1 and the AC adapter 2 and the exchanges indicated by symbols b21 to b24 between the EC 14 and the PDC 15 are the same as those in the comparative example shown in FIG. 2, and thus, the explanation will be omitted.

The EC 14 starts the operation upon reception of power of 3V/3A from the DC/DC converter 13, and at that time, if an interrupt signal is supplied from the PDC 15, the EC 14 acquires Power Status from the PDC 15 and performs initialization of the register for interrupt signal. Then, the EC 14 acquires an input voltage value of the charger 12 from the charger 12 (FIG. 3: c31 and c32). As mentioned above, power output by the AC adapter 2 on the VBUS is directly supplied to the charger 12, and the EC 14 obtains 20V as the input voltage value of the charger 12.

Upon acquisition of the input voltage value of charger 12, the EC 14 compares the input voltage value with an input voltage value from the AC adapter 2 indicated by Power Status obtained from the PDC 15. If both values differ from each other, the EC 14 again acquires Power Status from the PDC 15 in accordance with the supply of second interrupt signal from the PDC 15 (FIG. 3: c21 and c22). A case where both values differ from each other is a case where the EC 14 does not recognize the supply of second interrupt signal to notify the latest Power Status from the PDC 15 to the EC 14 because of shifting between the time to start the operation of PDC 15 and the time to start the operation of EC 14. If the EC 14 completes the process with respect to the first interrupt signal before the PDC 15 supplies the second interrupt signal, that is, if the EC 14 finishes the initialization of the register for the first interrupt signal before the PDC 15 supplies the second interrupt signal, the EC 14 acquires the latest Power Status, and thus, the both values match with each other.

The EC 14 again acquires Power Status from the PDC 15, and thus, the EC 14 can change an incorrect recognition that the power 5V/3A is supplied from the AC adapter 2 to a correct recognition that the power 20V/3A is supplied from the AC adapter 2. As described above, the EC 14 allows charging of the battery 11 if the power received from the external device is 20V/3A. Thus, the EC 14 instructs the charger 12 to charge the battery 11 with the power from the AC adapter 2 (FIG. 3: c33). Therefore, in the electronic device 1 of the present embodiment, in the Dead Battery state, the battery 11 is properly charged after being connected to the AC adapter 2.

FIG. 4 is an exemplary flowchart showing the charge control of the battery 11 in the Dead Battery state performed by the electronic device 1 of the present embodiment.

The system of the electronic device 1 is turned off in the Dead Battery state, and now, a Source device such as the AC adapter 2 is connected to the Type-C port 16 of the electronic device 1. Then, the EC 14 starts the operation when the power supply is restarted from the DC/DC converter 13, and checks whether or not an interrupt signal is supplied from the PDC 15 (step S1). If the interrupt signal is not supplied (step S1: NO), the EC 14 ends the process. A case where the interrupt signal is not supplied from the PDC 15 when the EC 14 starts the operation occurs, for example, when the battery 11 which has been detached is reattached, and the power from the battery 11 is supplied to the EC 14 through the DC/DC converter 13.

If the interrupt signal is supplied from the PD 15 (step S1: YES), the EC 14 acquires a first Power Status from the PDC 15 (step S2), and performs initialization of the register for the interrupt signal in order to receive a next interrupt signal (step S3). As mentioned above, the initialization of the register for the interrupt signal may be referred to as clearing the interrupt signal.

Then, the EC 14 acquires an input voltage value from the charger 12 (step S4), and compares the input voltage value with an input voltage value indicated by the first Power Status acquired from the PDC 15 (step S5). If both values do not match (step S6: NO), the EC 14 again acquires a second Power Status from the PDC 15 (step S7). If both values match (step S6: YES), the EC 14 does not perform reacquisition of a second Power Status from the PDC 15.

On the basis of the second Power Status acquired, the EC 14 determines whether or not the battery 11 can be charged with a power from the AC adapter 2 (step S8). If the battery 11 can be charged (step S9: YES), the EC 14 instructs the charger 12 to charge the battery 11 with the power from the AC adapter 2 (step S10). If the battery 11 cannot be charged (step S9: NO), the EC 14 does not instruct the charger 12 to charge the battery 11 with the power from the AC adapter 2, and ends the process in the activation. A case where it is determined that the battery 11 cannot be charged occurs, for example, when the AC adapter 2 connected to the Type-C port 16 of the electronic device 1 outputs a power of 5V/3A alone.

As can be understood from the above, the electronic device 1 of the present embodiment can properly perform the battery 11 with the power from the AC adapter 2 connected to the Type-C port 16 of the electronic device 1 even if the times to start the operation differ between the PDC 15 and the EC 14.

That is, the electronic device 1 of the present embodiment can properly control the charging of the battery with the power externally input.

Note that, in the present embodiment, an example where the AC adapter 2 is connected to the Type-C port 16 of the electronic device 1 in the Dead Battery state. However, it is not limited to the AC adapter 2. Any external device which can operate as a Source device can be used to properly charge the battery 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device operable with a battery, the electronic device comprising:
   a connector connectable with a cable enabling data transfer and power transfer;
   a power delivery controller that controls power transfer between the electronic device and an external device connected to the electronic device via the connector;
   a power charge/discharge circuit that controls charging and discharging of the battery; and
   an embedded controller that communicates with the power delivery controller and the power charge/discharge circuit, and charges the battery with a power received from the external device, wherein
   the power delivery controller
      supplies a first interrupt signal to the embedded controller to cause the embedded controller to acquire first status data including a first power reception condition, when reception of the power from the external device is started, and
      supplies a second interrupt signal to the embedded controller to cause the embedded controller to acquire second status data including a second power reception condition, when a first voltage value of the power to be received from the external device is changed by communicating with the external device, and
   the embedded controller
      acquires the first status data from the power delivery controller, when the first interrupt signal from the power delivery controller is supplied in an activation time,
      acquires a second voltage value of the power to be received from the external device from the power charge/discharge circuit, after a process associated with the first interrupt signal is completed, and
      acquires the second status data from the power delivery controller, when the first voltage value indicated by the first status data is different from the second voltage value.

2. The electronic device of claim 1, further comprising a DC/DC convertor,
   wherein
   the power received from the external device is input into the power charge/discharge circuit without passing through the DC/DC converter in a state that the voltage value is unconverted, and
   the power received from the external device is input into the embedded controller with passing through the DC/DC converter in a state that the voltage value is converted.

3. The electronic device of claim 1,
   wherein the embedded controller
   allows charging of the battery with the power received from the external device, when the voltage value of the power received from the external device is greater than or equal to a threshold value, and
   disallows charging of the battery with the power received from the external device, when the voltage value of the power received from the external device is less than the threshold value.

4. The electronic device of claim 3,
   wherein the embedded controller
   notifies approval of charging of the battery with the power received from the external device to the power charge/discharge circuit, when the voltage value indicated by the second status data acquired from the power delivery controller is greater than or equal to the threshold value, and
   notifies disapproval of charging of the battery with the power received from the external device to the power charge/discharge circuit, when the voltage value indicated by the second status data is less than the threshold value.

5. The electronic device of claim 3,
   wherein the power delivery controller changes the voltage value of the power received from the external device to be greater than or equal to the threshold value, when the voltage value is less than the threshold value.

6. The electronic device of claim 5,
   wherein the power delivery controller selects any one from voltage values of the power able to be supplied by the external device, based on data indicative of power transmission performance of the external device sent from the external device.

7. The electronic device of claim 1,
   wherein the embedded controller completes the process associated with the first interrupt signal by initializing a register in which the first interrupt signal is stored.

8. The electronic device of claim 1,
   wherein the connector comprises a universal serial bus (USB) Type-C standard connector.

9. The electronic device of claim 8,
wherein the power delivery controller comprises a controller conforming to Power Delivery defined by the USB Type-C standard.

10. The electronic device of claim 9,
wherein the power delivery controller communicates with the external device through a CC line defined by the USB Type-C standard.

11. The electronic device of claim 1,
wherein the embedded controller communicates with the power delivery controller and the power charge/discharge circuit through an I²C bus.

12. A charging control method of an electronic device operable with a battery,
the electronic device comprising a power delivery controller and an embedded controller,
the power delivery controller controlling power transfer between the electronic device and an external device connected to the electronic device,
the embedded controller causing a power charge/discharge circuit to charge the battery with a power received from the external device,
the method comprising:
supplying, by the power delivery controller, a first interrupt signal to the embedded controller to cause the embedded controller to acquire first status data including a first power reception condition, when the power delivery controller starts receiving the power from the external device;
supplying, by the power delivery controller, a second interrupt signal to the embedded controller to cause the embedded controller to acquire second status data including a second power reception condition, when a first voltage value of the power to be received from the external device is changed by communicating with the external device;
acquiring, by the embedded controller, the first status data from the power delivery controller, when the first interrupt signal from the power delivery controller is supplied in an activation time;
acquiring, by the embedded controller, a second voltage value of the power to be received from the external device from the power charge/discharge circuit, after a process associated with the first interrupt signal is completed; and
acquiring, by the embedded controller, the second status data from the power delivery controller, when the first voltage value indicated by the first status data is different from the second voltage value.

13. The charging control method of claim 12, further comprising:
allowing, by the embedded controller, charging of the battery with the power received from the external device, when the voltage value of the power received from the external device is greater than or equal to a threshold value; and
disallowing, by the embedded controller, charging of the battery with the power received from the external device, when the voltage value of the power received from the external device is less than the threshold value.

14. The charging control method of claim 13, further comprising:
notifying, by the embedded controller, approval of charging of the battery with the power received from the external device to the power charge/discharge circuit, when the voltage value indicated by the second status data acquired from the power delivery controller is greater than or equal to the threshold value; and
notifying, by the embedded controller, disapproval of charging of the battery with the power received from the external device to the power charge/discharge circuit, when the voltage value indicated by the second status data is less than the threshold value.

15. The charging control method of claim 12, further comprising:
completing, by the embedded controller, the process associated with the first interrupt signal by initializing a register in which the first interrupt signal is stored.

* * * * *